US008201078B2

(12) United States Patent
Boyer et al.

(10) Patent No.: US 8,201,078 B2
(45) Date of Patent: Jun. 12, 2012

(54) BUSINESS PROCESS ENABLEMENT OF ELECTRONIC DOCUMENTS

(75) Inventors: John Boyer, Victoria (CA); Martin F. Dunn, Victoria (CA); Maureen E. Kraft, Hudson, MA (US); Jun Liu, Shanghai (CN); Mihir R. Shah, Maharashtra (IN); He Feng Su, Beijing (CN); Saurabh Tiwari, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 12/211,156

(22) Filed: Sep. 16, 2008

(65) Prior Publication Data

US 2010/0070562 A1 Mar. 18, 2010

(51) Int. Cl.
*G06F 17/00* (2006.01)
(52) U.S. Cl. .................... 715/221; 715/224; 715/234
(58) Field of Classification Search .................. 715/212, 715/221, 224, 234–236; 713/194
See application file for complete search history.

(56) References Cited

U.S. PATENT DOCUMENTS

| 7,752,537 | B2 * | 7/2010 | Beynon et al. | 715/222 |
| 2006/0167912 | A1 * | 7/2006 | Coulson et al. | 707/101 |
| 2006/0206822 | A1 * | 9/2006 | DeWitt | 715/733 |
| 2007/0288767 | A1 * | 12/2007 | Boyer et al. | 713/194 |
| 2008/0235258 | A1 * | 9/2008 | Chung et al. | 707/102 |

OTHER PUBLICATIONS

John Boyer, "XFDL: The Extensible Forms Description Language, An XML-based forms language for e-commerce", Dec. 1999, Dr. Dobb's Journal, pp. 1-7.*
W3C, XForms 1.1, W3C Candidate Recommendation Nov. 29, 2007, Copyright 2007, 122 pages.
IBM developerWorks: Blogs : IBM Lotus Forms and Next Generation Web 2.0 Applications, May 8, 2008, 2 pages.
John Boyer, Dr. Dobb's Portal, XFDL: The Extensible Forms Description Language, Dec. 1, 1999, 6 pages.

* cited by examiner

*Primary Examiner* — Chau Nguyen
(74) *Attorney, Agent, or Firm* — Cantor Colburn LLP; Libby Toub

(57) ABSTRACT

Business process enablement of electronic documents is provided. A method includes populating an electronic document supporting structured and unstructured content. The electronic document includes a description identifying a server and the content. The method further includes notifying a document processor of a submission event. The method also includes serializing a portion of the electronic document containing some of the unstructured content. The method additionally includes submitting the electronic document to the server in response to the submission event.

14 Claims, 6 Drawing Sheets

| Investment certificates, intangibles, and claims for or rights to payments in connection with the investment, security, savings bond, account or deposit |||| 401 |
|---|---|---|---|---|
| Items or Kind | Collateral/Series/ Account# | Details | Value (USD) | 402 |
| Investment Bond | UN88832432 | HSBC Bank, Mumbai | 12000 | |
| Security | PN77234232 | Reserve Bank of India | 5000 | |
| Saving Bond | IN23232332 | ICICI BANK, 1212 | 3000 | |

Security Interest extends to include all Interest earned on the Account, Term Deposit or Investment Certificate

Loan Security Distribution

- UNSECURED LOAN 18.87%
- VEHICLES 15.09%
- CONSUMER GOODS 5.66%
- DEPOSITS 26.42%
- INVESTMENTS/SECURITIES 33.96%

404

Part 4: Additional Terms & Conditions for Agreement

None.

Part 5: Signature

BUSINESS PROCESS ENABLEMENT OF ELECTRONIC DOCUMENTS

BACKGROUND

The present invention relates to semi-structured electronic documents, and more specifically to business process enablement of electronic documents containing unstructured content and optionally some structured content.

The virtual ubiquity of editors (e.g., word processors, spreadsheet software) for semi-structured electronic documents makes them valuable means of enabling end users to create semi-structured content. However, software needed for end users to collaboratively create the content is far from well integrated. Users may struggle with change tracking, local disk operations and email attachments to manually control content integration. Ad hoc collaboration can degenerate as outdated copies proliferate from multiple users making edits out of turn.

Server software for collaboration may allow users to set up a common repository for working on shared documents. However, these approaches provide a specific server-side system into which the office documents are integrated. In other words, end-users get locked into the system solution, which may be proprietary and offer limited interoperability.

In turn, important features needed to integrate with arbitrary business processes tend not to be available in the closed vendor-specific systems. For example, digital signatures may be more important in open systems as a means of producing legally binding agreements. As a further example, electronically drafted contracts tend to be long and involved, with many complex sections, yet current systems persist in offering a generic user interface that does little to help users navigate the complexities of the document or the business process in which it is involved.

SUMMARY

According to one embodiment of the present invention, a method for business process enablement of electronic documents is provided. The method includes populating an electronic document supporting structured and unstructured content. The electronic document includes a description identifying a server and the content. The method further includes notifying a document processor of a submission event. The method also includes serializing a portion of the electronic document containing some of the unstructured content. The method additionally includes submitting the electronic document to the server in response to the submission event.

A further embodiment is a system for business process enablement of electronic documents. The system includes a document processor executing on a client system. The client system supports communication with a server. The system further includes an electronic document with a description identifying the server, process logic, and content. The electronic document is interfaced to the document processor. The document processor submits the electronic document to the server in response to a submission event.

Another embodiment is a computer program product for business process enablement of electronic documents. The computer program product includes a storage medium readable by a processing unit and storing instructions for execution by the processing unit for implementing a method. The method includes populating an electronic document supporting structured and unstructured content. The electronic document includes a description identifying a server, and the content. The method further includes serializing a portion of the electronic document containing some of the unstructured content, and submitting the electronic document to the server.

An additional embodiment is a method for business process enablement of electronic documents. The method includes receiving an electronic document supporting structured and unstructured content at a client system. The electronic document includes a description identifying a server to submit the electronic document, business process logic controlling actions performed on the electronic document, and the content. The method further includes populating the electronic document using web services, applying a digital signature to the electronic document, and serializing a portion of the electronic document that includes some of the unstructured content. The method also includes submitting the electronic document to the server.

A further embodiment is a computer program product for business process enablement of electronic documents. The computer program product includes a storage medium readable by a processing unit and storing instructions for execution by the processing unit for implementing a method. The method includes receiving an electronic document supporting structured and unstructured content at a client system. The electronic document includes a description identifying a server to submit the electronic document, business process logic controlling actions performed on the electronic document, and the content. The method further includes populating the electronic document using web services, applying a digital signature to the electronic document, and serializing a portion of the electronic document that includes some of the unstructured content. The method further includes submitting the serialized electronic document to the server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a user interface with process assistance in accordance with exemplary embodiments;

FIG. 4 depicts an example of a user interface combining structured and unstructured content in an electronic document;

FIG. 5 depicts a completion phase to affix a digital signature over an electronic document.

DETAILED DESCRIPTION

The invention as described herein provides business process enablement of electronic documents. While typical electronic documents are static collections of data that are written to and read from a storage medium, they are managed separately from business processes that drive their creation and management. For example, a business process may involve a number of parties populating a proposal, an application, a specification, a complex contract, a patent application, and the like. Various parties involved can have different roles such as technical, marketing, pricing, executive, quality assurance, and so forth, to collaborate and perform process steps at distinct points in time. While referred to as a "business process", the scope of the invention is not limited to "for-profit" activities, but can be applied in any context that involves a formal workflow process, such as college applications, grant applications, tax forms, and the like. When a separate business process management tool is used to provide process logic and control access to the typical electronic document, the resulting work product can become locked into a server-side system. In an exemplary embodiment, a client-side document processor provides editing capabilities for an electronic document that includes a description identifying the server, process logic, and structured and/or unstructured content. The process logic in the electronic document can include data entry and validation logic for specific business processes, as well submission logic to trigger submission of the electronic document to server-side processes. Embedding the server description, process logic, and content into the electronic document may enable an open flow between various client and server systems without being locked into a single proprietary solution.

In an exemplary embodiment, the electronic document supports both structured and unstructured content. Structured content may include data that must comply with formatting constraints or correlate to specific items, such as key values in a database, e.g., a serial number. Unstructured content can include free-flowing text and rich content, such as charts, tables, graphs, audio/video clips, and other linked or embedded objects. The electronic document can also include wizard-like assistance in populating the electronic document and can access web services to further enhance the fill experience. Additionally, the electronic document may support affixing digital signatures to protect the content of the electronic document from unauthorized modifications. One or many collaborators can create, modify and secure semi-structured or unstructured content in the electronic document that freely transitions between the client-side and server-side as needed. The document processor enables creation, editing, and submission of the complete electronic document (not merely the data within the electronic document) to the server identified in the electronic document.

Figure 1:
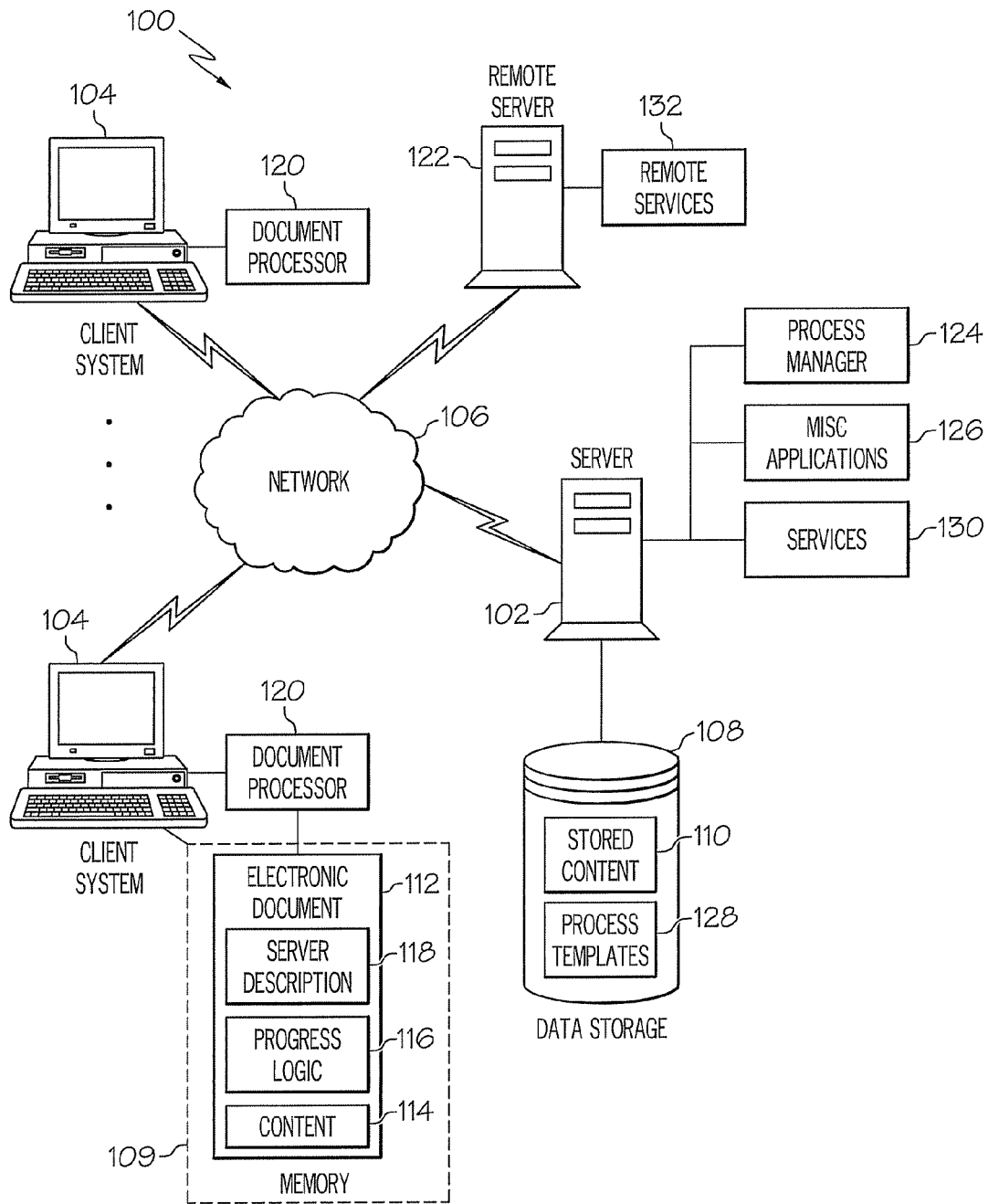
FIG. 1 depicts a block diagram illustrating an exemplary system that may be utilized to implement exemplary embodiments of the present invention.

Turning now to the drawings, it will be seen that in FIG. 1 there is a block diagram of a system 100 upon which business process enablement of electronic documents is implemented in exemplary embodiments. The system 100 of FIG. 1 includes a server 102 in communication with client systems 104 over a network 106. In exemplary embodiments, the server 102 is a high-speed processing device (e.g., a mainframe computer, a desktop computer, a laptop computer, or the like) including at least one processing circuit (e.g., a CPU) capable of reading and executing instructions, and handling numerous interaction requests from the client systems 104 as a shared physical resource. The server 102 may perform as a file server for storing and accessing various files. The server 102 can also run other applications, and may serve as a Web server, applications server, and/or a database server.

In exemplary embodiments, the client systems 104 comprise desktop, laptop, general-purpose computer devices, and/or networked devices with processing circuits and I/O interfaces, such as a keyboard and display device (e.g., Web-enabled phones or handheld devices). Users can initiate various tasks locally on the client systems 104, such as creating or editing an electronic document 112 in memory 109 of the client systems 104. In an exemplary embodiment, the electronic document 112 includes not only content 114, but also includes process logic 116, and a server description 118. The content 114 can include structured and/or unstructured content. The process logic 116 may include assistance, validation, and submission functions or methods that can be interpreted and acted upon by document processor 120. The process logic 116 can be tailored to specific business processes as part of a business workflow. The document processor 120 can execute the process logic 116 or respond to messages or events triggered via the process logic 116. Upon a submission event, the document processor 120 sends the electronic document 112 over the network 106 to the server 102 for further processing or storage to the data storage device 108 as stored content 110.

The network 106 may be any type of communications network known in the art. For example, the network 106 may be an intranet, extranet, or an internetwork, such as the Internet, or a combination thereof. The network 106 can include wireless, wired, and/or fiber optic links. Additional servers, such as remote server 122, can also be accessed via the network 106. The single server 102 may also represent a cluster of servers collectively performing processes as described in greater detail herein.

The data storage device 108 refers to any type of computer readable storage medium and may comprise a secondary storage element, e.g., hard disk drive (HDD), tape, or a storage subsystem that is internal or external to the server 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the server 102.

In exemplary embodiments, the server 102 executes various applications, including a process manager 124 and miscellaneous applications 126. The process manager 124 can be used to coordinate server-side activities and handle distribution of the electronic document 112 as it moves between the client systems 104 and the data storage device 108. The miscellaneous applications 126 can include various applications that assist in generating process templates 128 and creating and publishing services 130, as well as performing server-side document processing. The process templates 128 in the data storage device 108 can be designed to include a process flow for business processes embodied in the process logic 116 in the electronic document 112. The process templates 128 can include distribution lists to populate with roles of users at the client systems 104 for controlling the permissions and flow between the users. The services 130 can include web services as part of a service-oriented architecture, as well as publishing feeds, e.g., really simple syndication (RSS) and/or ATOM publishing protocol. Similarly, the remote server 122 can also provide remote services 132 as web services and feeds.

The electronic document 112, also referred to as an "office document", can be organized as a single file format or a combination of file formats. One example of a single office document file format is an OpenDocument format (ODF) that defines file formatting for electronic office documents such as spreadsheets, charts, presentations and word processing documents. To connect an ODF office document to a business process, additional features may be added, producing the electronic document 112. Full document submission of the electronic document 112 to the server 102 can be achieved in ODF by adding support for ODF content types to a serialization attribute of XForms submissions, as exemplified by the following markup:

```
<xforms:submission
    resource="http://www.example.org/someServerScript . . . "
    serialization="application/vnd.oasis.opendocument.text;
    content encoding=base64"
    . . .
/>
```

XForms is an extensible markup language (XML) format for the specification of a data processing model for XML data and user interface(s) for the XML data, such as web forms. XForms provides a processing model that is defined for XML data (e.g., content 114) within a document, such as the electronic document 112. The document can have one or more instances of XML data, each of which is handled as if it were a separate in-memory document object model (DOM) during execution of the document by the document processor 120. The name instance comes from the possibility that the XML data is an instance of an XML schema, though an XForms instance is not required to be associated with a schema.

The XForms model augments the XML instance data with model item properties such as "type", "readonly", "relevant", "required", and "constraint". These model item properties associate run-time metadata with nodes of XML data, and they can be attached to nodes of XML data using XPath expressions. The values of most of the model item properties can also be determined using XPath expressions. This allows the form author to specify the model item property value by a formula that is automatically re-evaluated whenever dependent nodes of XML data are changed. For example, the process templates 128 may be XForms that are further populated to become electronic document 112 instances. The XForms model includes a submission capability. A model can contain any number of submission elements, each of which can respond to events that perform further actions, such as data mutations or further submissions. The result of a submission can replace the entire electronic document 112 containing the XForms, or it can replace some of the content 114, or it can be ignored.

ODF can integrate the XForms model into its form element, which also includes a set of abstract form control elements, such as "form:text", that select XML data to operate upon and set other basic user interface properties. ODF may expose its abstract form controls to a free-flowing presentation layer markup using a "draw:control" element. The main layers in the integration of ODF and XForms can include an ODF presentation layer, an abstract form control layer, a business logic and dynamic validation layer (e.g., to implement process logic 116), and a data access and validation layer that includes multiple data instances (e.g., content 114). The relationship between XML data nodes, abstract form controls and presentation layer elements can be handled using ID references. For example, an XForms model can contain any number of "xf:bind" elements, each of which indicates one or more nodes using a "nodeset" attribute. An xf:bind can also have an id attribute, which makes it a named site for a set of nodes that can be referenced by the id attribute value. An ODF form control uses an xf:bind attribute to indicate an xf:bind element by ID reference. Similarly, each ODF form control may have a "form:id" attribute that allows the presentation layer draw:control element to refer to it with a draw:control attribute.

The xf:bind attribute in XForms can do more than connect an ODF form control to an XForms bind site. The xf:bind attribute expresses a user interface binding, which has several implications for the XForms model processor (e.g., document processor 120), which exposes the node value and model item property values to the bound form control, and dispatches value and model item property change notification events to the bound form control. If the XForms model binds a type or constraint model item property (MIP) to a node, and a user enters incorrect data content, then the form control can prominently indicate that there is an error, and the XForms model processor dispatches an "xforms-invalid" event to the element containing the user interface binding attribute. XForms authors have the option of hooking this event and performing an action script, such as raising a message to assist the user in understanding how to correct the error or execute a "setvalue" method to fix the error under certain conditions. If the XForms model binds a readonly MIP to a node, and the value is true, then the user is not allowed to modify the data. The readonly MIP has an inheritance rule, so all nodes in a DOM subtree can be made read-only by setting the subtree root to readonly. This can make entire sets of bound form controls behave as if they were readonly. The document processor 120 can detect changes of state after initialization by listening for xforms-readonly and xforms-readwrite events dispatched by the electronic document 112 when embodied as an XForms model.

If the XForms model binds a relevant MIP to a node, and the value is false, then the form control may be either hidden or disabled. This MIP also has an inheritance rule that can affect multiple form controls bound to nodes in a subtree by setting the subtree root node's relevance. The XForms model may support dynamic recalculation of MIPs, which enables conditional relevance for choreographing wizard-like behaviors that take a user of client system 104 through a step-by-step process to assist in completing a complex fill experience.

To transport the electronic document 112 to the server 102, a "submit-serialize" event can be used to submit arbitrary data, XML or otherwise, to the server 102. The electronic document 112 can include a content type indicator to further define the type of data serialized, enabling document processors 120, process manager 124, and miscellaneous applications 126 to decode/reconstruct the serialized content. Serialization can be performed on any portion of the electronic document 112, including structured and/or unstructured portions of the content 114. This can also be used to allow a host document processor to control the content uploaded by the submission. The document processor 120 can listen for the event, and detect content type appearing in the serialization attribute of the event target submission element, and redefine the submit serialization to contain the entire electronic document 112. This allows the electronic document 112 to return itself to the server 102 for business processing and to participate in further workflow steps or be stored as a completed document in the stored content 110. A wizard experience capability can be offered directly within ODF based on supporting XForms model relevance at the presentation layer.

Access to web services and ATOM services (e.g., services 130 and remote services 132) can be obtained by support of the extensions to XForms submission. XForms extensions for SOAP-based web services can be added to the document processor 120 and the electronic document 112. ATOM services may be implemented through the addition of "put" and "delete" methods for method attributes. The integration of XML signatures with ODF can follow a similar approach as integration of XML signatures with extensible forms description language (XFDL). Specifically, the XML signature can be generated into the XML data managed by an XForms processor, such as the document processor 120. Although described in reference to a single ODF office document based on improved XForms support, the invention can be embodied in any office document format by creating custom extensions to the office document format and its run-time processor that implement the features described herein.

In an exemplary embodiment, the electronic document 112 exploits XForms markup support in two rich document formats, XFDL and ODF as a "dual form" implementation. At the document level, the XFDL form has a file attachment/containment capability, and it also has a full document submission capability. Therefore, the XFDL form can be used as a container and transport envelope for an ODF office document representing a complex contract or agreement. The XFDL form may also include digital signature support, and once affixed, a digital signature protects not only the XFDL form, but also the ODF attachment within it. The ODF document provides editable free-flowing text for complex, multi-page documents. It may also include rich content elements like pie charts and bar graphs to serve as visual aids. The XFDL form can provide a wizard-like front-end for the electronic document 112 to help users enter data systematically. This interaction may include access to SOAP-based web services and ATOM services from the XFDL form, such as services 130 and remote services 132 across the network 106.

Figure 2:
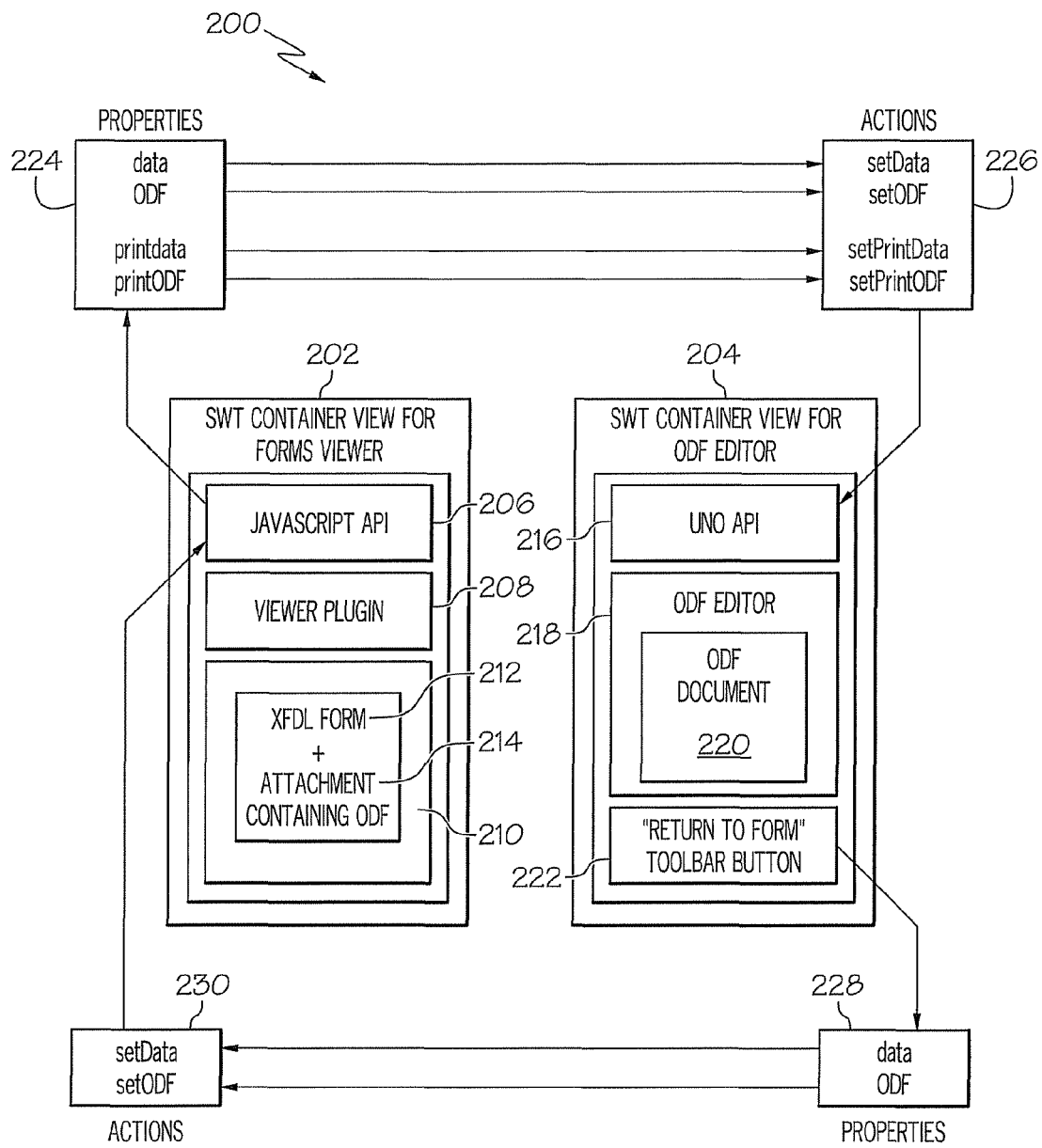
FIG. 2 depicts an example of a dual format electronic document in accordance with exemplary embodiments.

FIG. 2 depicts an example of a dual form implementation of the electronic document 112 of FIG. 1 in block diagram 200. The block diagram 200 illustrates a dual view design mashup that performs the tasks of the document processor 120 of FIG. 1. The block diagram 200 includes a standard widget toolkit (SWT) container view of a forms viewer (form view) 202 and an SWT container view for an ODF editor (ODF view) 204. In an exemplary embodiment, the form view 202 includes JavaScript application programming interface (API) 206, viewer plug-in 208, and an electronic document 210 containing XFDL form 212 and an attachment containing ODF 214. The ODF view 204 may include a universal network objects (UNO) API 216, an ODF editor 218, an ODF document 220, and a "Return to Form" toolbar button 222. Based on an event in the XFDL form 212 that can be controlled by the form author, switching between the form view 202 to the ODF view 204 is performed. For example, switching can be managed using the document processor 120 of FIG. 1. When switching occurs, the JavaScript API 206 is used to obtain XForms instance data of the XFDL form 212 and the ODF attachment 214 and set them into matching properties 224 for the form view 202. This triggers invocation of corresponding setter method actions 226 for the ODF view 204. The setter method implementations use the UNO API 216 to instantiate ODF content in the ODF document 220 and update it with XML data. Thus, ODF content in ODF document 220 is rendered after it is updated by the latest XML data entered into the XFDL form 212.

The end-user may edit the XML data using ODF form controls to modify the ODF document 220. The end-user may also edit the free-flowing text of the ODF document 220, for example to add special terms and conditions beyond those that might reasonably appear in a document template, which may have been defined via process templates 128 of FIG. 1. When the user triggers the "return to form" toolbar button 222, the UNO API 216 is again used to obtain XML data as well as a serialization of the ODF content from the ODF document 220. These are used to set the data and ODF properties 228 of the ODF view 204. Corresponding setter method actions 230 are invoked in the form view 202. The implementations of the setter method actions 230 use the JavaScript API 206 to push the updated ODF content and the XML data into the running XFDL form 212 with attachment containing ODF 214. Thus, when the end-user affixes a digital signature onto the XFDL form 212, the electronic document 210 contains the latest ODF content and is rendering the correct data as amended during the ODF view experience via the ODF view 204.

Print capability may be handled the same as setting data between views 202 and 204. However, the ODF view 204 can simply print ODF without taking the focus from the form view 202. For both view and print operations, simplicity is possible since both rich document formats (XFDL and ODF) have an underlying basis in XForms.

Figure 3:
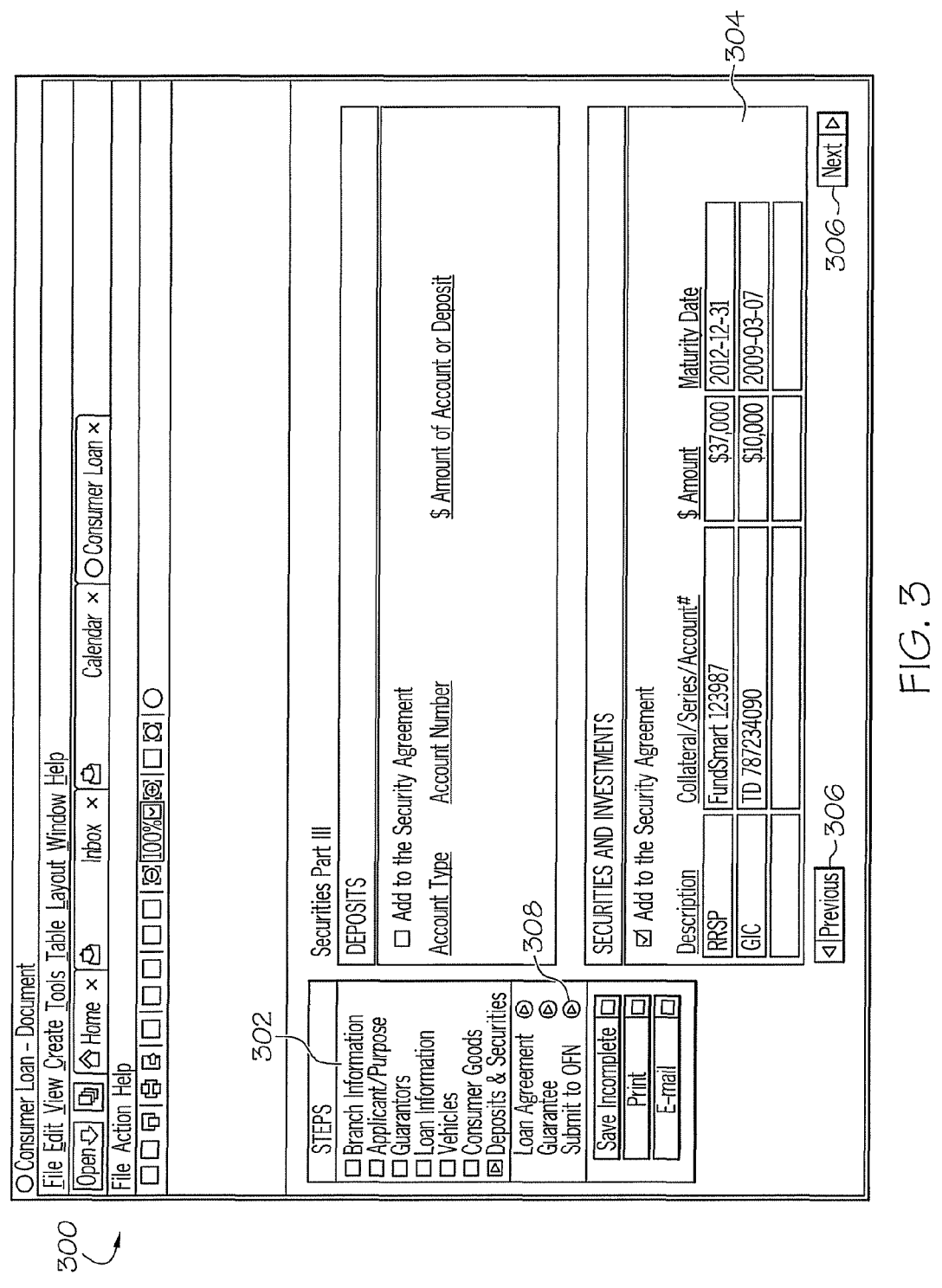

A client-side usage pattern for the dual form may begin with receiving the electronic document 210 of FIG. 2 as an XFDL form from a web resource or an email at the client system 104 of FIG. 1. FIG. 3 depicts an example of a user interface screen 300 for a hypothetical consumer loan application as the electronic document 210 of FIG. 2, in which end-users receive a step-by-step wizard experience to help guide them through the process of providing the more structured data required by the overall office document application. This is also where the services 130 and remote services 132 of FIG. 1 can be invoked to further enhance the user fill experience. For example, process steps 302 are depicted to indicate various types of data to be collected as part of the business process. Text input boxes 304 provide controls for inputting form text. Navigation buttons 306 may be included to simplify transitions between process steps. A submit button 308 can be used to return the electronic document 210 to the server 102.

The author of the electronic document 210 of FIG. 2 can determine at what point the end-user is allowed to proceed to editing the attachment containing ODF 214 in the XFDL form 212 based on the design of the process template 128 of FIG. 1 associated with the electronic document 210. FIG. 4 depicts sample content in a user interface 400 for the hypothetical consumer loan application of FIG. 3, which can include the structured data along with rich content items that serve as visual aids, as well as free-flowing text 401 for customizing the agreement with specialized terms and conditions. For example, a table 402 and a chart 404 are included as rich content items.

When the end-user finishes interacting with the electronic document 210, a toolbar button on the view container for the office document editor allows the end-user to return to the XFDL form view (e.g., "Return to Form" toolbar button 222 of FIG. 2). Changes made during the office document edit experience (e.g., ODF document 220) are reflected back to the attachment containing ODF 214 in the XFDL form 212, as well as the underlying structured data shared by the XFDL form and the "fill in the blanks" parts of the electronic document 210 of FIG. 2.

Figure 5:
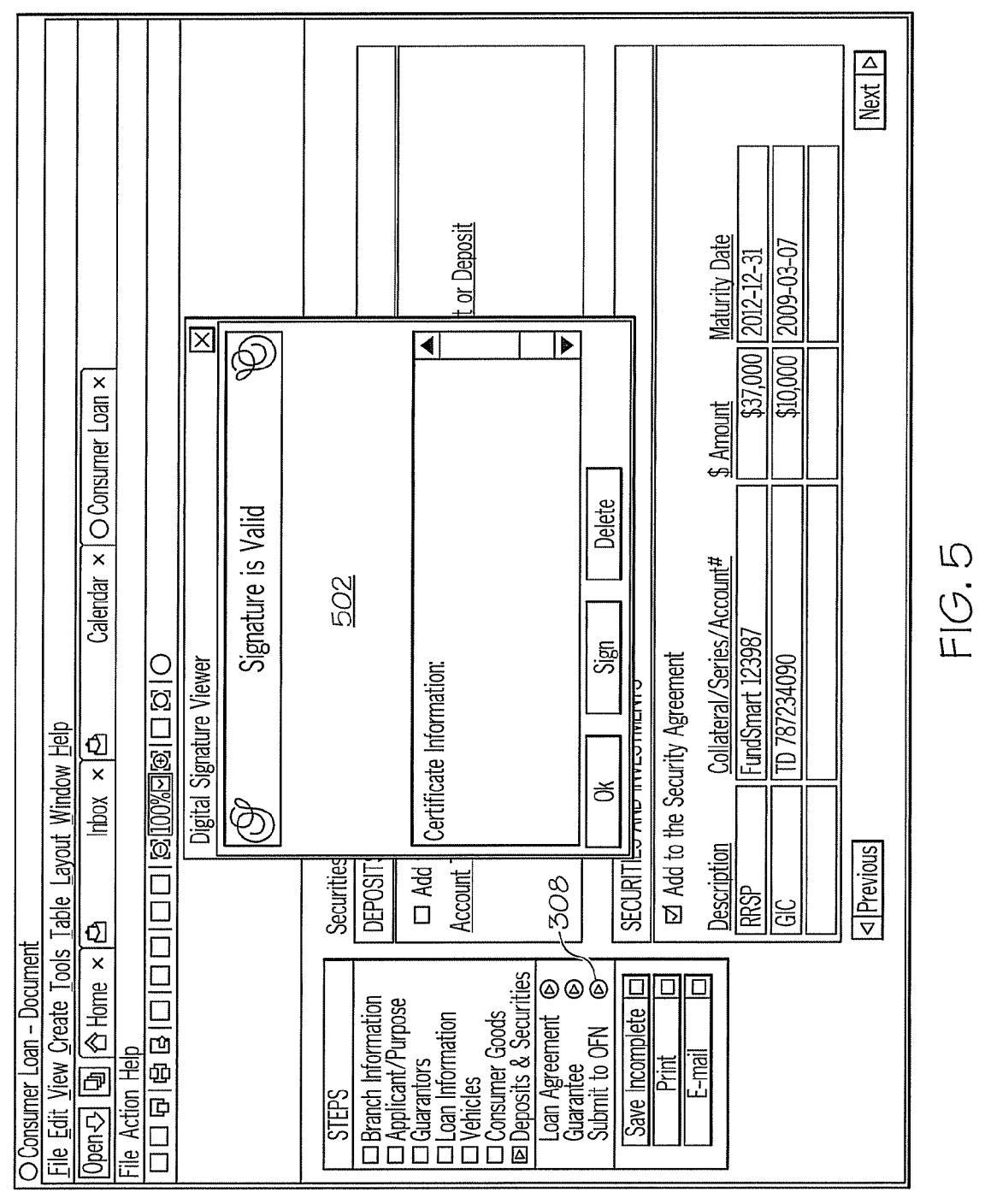

Conditions that switch between the view 202 and 204 may also advance the XFDL form wizard to a digital signatures step, if included, or to a document submission step. Thus, when the user returns from the ODF view 204 to the form view 202, the user experience may already have advanced to a signing page or a submission page (or a sign and submit page). FIG. 5 depicts completion a phase to affix a digital signature over the electronic document 210 for the hypothetical consumer loan application of FIGS. 3 and 4. A digital signature viewer 500 is depicted, applying a digital signature over the user XFDL form 212, including the attached ODF office document 214. The digital signature viewer 500 may output information associated with the digital signature, including the signing party's identity, algorithms employed, and version information.

Upon completing, the electronic document 210, the user can trigger button 308 to submit the electronic document 210 back to a server-side business process (e.g., process manager 124 of FIG. 1). The electronic document 210 may enter the next stage of a workflow, such as an approval. The completed electronic document 210 can kick off a business transaction and/or can be saved as stored content 110 of FIG. 1 for future reference.

A shared XML data kernel may be used to offer user assistance via a wizard-like experience and to provide access to web services (e.g., services 130 and remote services 132 of FIG. 1) during the fill experience. A version of the dual forms methodology can be implemented based only on having an electronic form act as a containment and transport envelope for the electronic document 210 of FIG. 2, and optionally also offering the digital signature capability. In this case, immediately upon activating the form view 202, the user experience is switched to the ODF view 204 since only the ODF editor 218 may be available. Once completed, the user may then switch to sign and/or submit phases. This variation can be used with various binary files that are treated as objects, that may not otherwise support XML.

Figure 6:
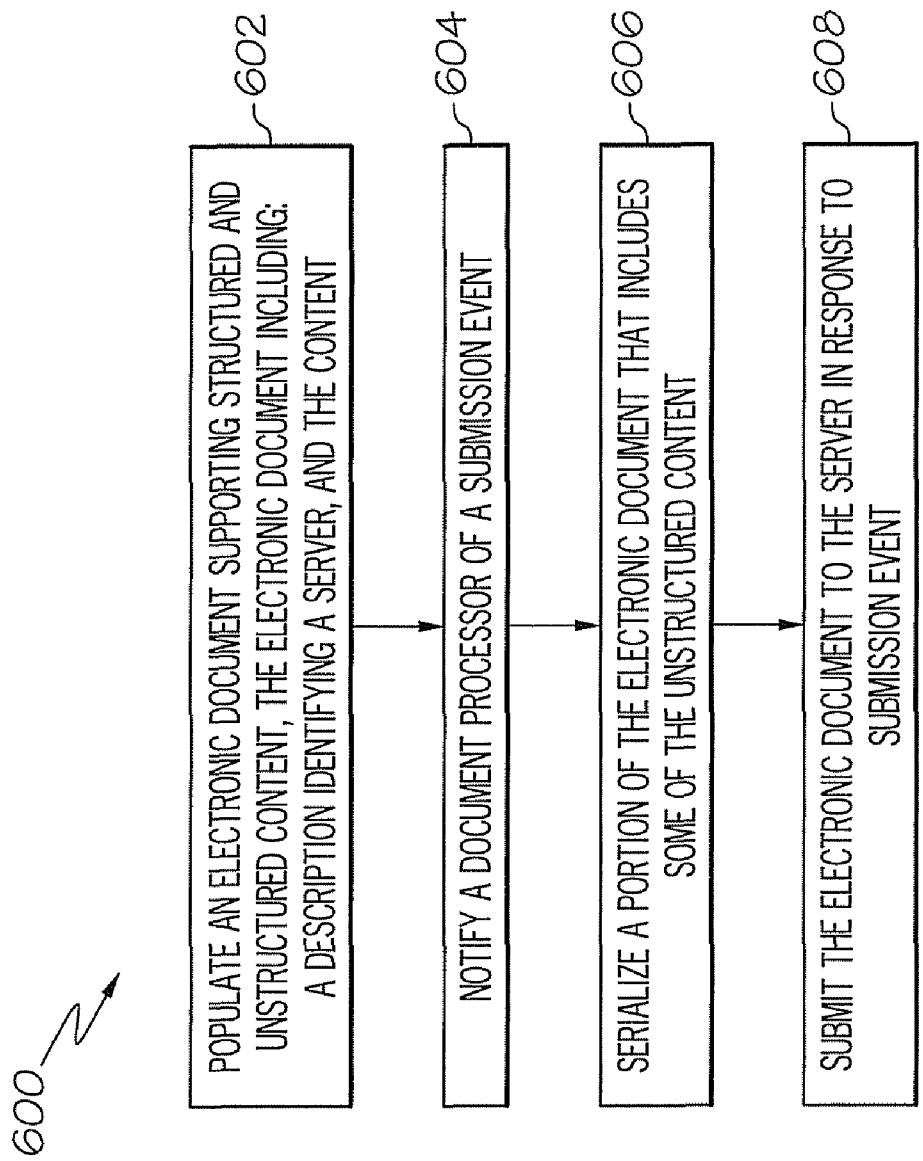
FIG. 6 depicts an exemplary process for business process enablement of electronic documents.

Turning now to FIG. 6, a process 600 for business process enablement of electronic documents will now be described in accordance with exemplary embodiments, and in reference to FIGS. 1-5. An author can create process templates 128 that provide a starting point for populating an electronic document using a single format or multiple formats, such as electronic document 112 and/or 210. For ease of explanation, only the electronic document 112 is referred to in the forgoing description; however, the process 600 can be applied to the electronic document 210 as well. The process manager 124 can initiate a business process associated with populating the electronic document 112, assign roles to various users, and send the electronic document to client system 104 to be populated.

At block 602, the document processor 120 can access the process logic 116 to determine how to present contents of the electronic document 112 to a user of client system 104 for populating the electronic document 112, for instance, using XForms and creating user interface contents as depicted in FIGS. 3-5. The process logic 116 may define steps of a fill experience as part of a business process and validate the content 114 populated in the electronic document 112. Should validation fail, the document processor 120 can abort submitting the electronic document 112. The process logic 116 can further include methods responsive to user input to perform actions upon the electronic document 112 and modify properties of the electronic document 112.

The electronic document 112 may include both structured and unstructured content, making it more dynamic than a standard form, but also supporting more rules than a general-purpose document. In an exemplary embodiment, the electronic document 112 is pre-populated with server description 118 that informs the document processor 120 where to submit the electronic document 112. The server description 118 may be filled in at the server 102, prior to initially distributing the electronic document 112 to be populated at the client system 104. Content 114 in the electronic document 112 may be XML data instances and/or other formats. A user of the client system 104 can interactively populate the content 114, which may include the use of web services and ATOM feeds via the services 130 and/or remote services 132 to provide a wizard-like fill experience. The document processor 120 can also apply a digital signature to the electronic document 112 to prevent unauthorized modifications.

At block 604, the process logic 116 notifies the document processor 120 of a submission event based on user input. For example, submit button 308 may appear on a user interface and drive the process logic 116 to perform actions and notify the document processor 120. The document processor 120 can read the server description 118 to determine where to direct the electronic document 112.

At block 606, the document processor 120 may serialize a portion of the electronic document 112 that includes some of the unstructured content in the content 114. Serialization can include serializing any portion or all of the content 114, including unstructured and structured content. Serialization may minimize formatting issues on various platform configurations.

At block 608, the document processor 120 submits the electronic document 112 as serialized to the server 102 in response to the submission event. The document processor 120 can transfer the electronic document 112 to the server 102 absent a user initiated save request and absent a user initiated electronic mail message. The server 102 receives the electronic document 112 and analyzes the electronic document 112 to determine a next process step. The process manager 124 may access the process logic 116 of the electronic document 112 to determine the next process step. For example, the server can distribute the electronic document 112 to another application on the server 102 or to another client system 104 in response to determining that the electronic document 112 is incomplete. The server 102 may store the electronic document 112 in response to determining that the electronic document 112 is complete.

Technical effects include providing business process enablement of electronic documents. Imbuing an electronic document with a description of the server to which the full document can be returned enables a document processor to automatically route the electronic document from a client system to the server in response to a submission event. Embedding business process logic in the electronic document that can perform functions upon the electronic document may enhance portability, security, support semi-structured content within the electronic document, and enable wizard-like assistance in populating the electronic document. Directly supporting collaborative content creation can reduce inefficiencies relative to manual collaboration based only on change tracking, saving to disk, emailing, and manually pushing only completed documents into business process systems. Using exemplary embodiments as described herein, electronic documents "know" what process they belong to and how to get from each collaborator back to the server without local saving or email.

The capabilities of the present invention can be implemented in software, firmware, hardware or some combination thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device or a magnetic storage device. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
    populating an electronic document supporting structured and unstructured content, wherein the electronic document is comprised of multiple formats including an open document format (ODF) in an extensible forms description language (XFDL) format container, and wherein the electronic document including the open document format (ODF) in the XFDL format container further comprises:
        process logic that defines steps of a fill experience and validates the structured and unstructured content populated in the electronic document;
        a description identifying a server; and
        the structured and unstructured content;
    notifying a document processor of a submission event;
    serializing a portion of the electronic document, which includes the open document format (ODF) in the XFDL format container, that includes some of the unstructured content; and
    submitting the electronic document including the open document format (ODF) in the XFDL format container to the server in response to the submission event.

2. The method of claim 1 wherein the process logic further includes method responsive to user input to perform actions upon the electronic document including the open document format (ODF) in the XFDL format container and modify properties of the electronic document including the open document format (ODF) in the XFDL format container.

3. The method of claim 1 further comprising:
    determining by the process logic whether any of the structured and unstructured content of the electronic document including the open document format (ODF) in the XFDL format container is invalid, and in the event of the structured and unstructured content of the electronic document including the open document format (ODF) in the XFDL format container is determined to be invalid, aborting the submitting, and in the event none of the content of the electronic document including the open document format (ODF) in the XFDL format container is determined to be invalid, receiving the electronic document including the open document format (ODF) in the XFDL format container by the server.

4. The method of claim 1 further comprising:
    accessing at least one of the server and a remote server to provide a service to assist in populating the electronic document including the open document format (ODF) in the XFDL format container.

5. The method of claim 1 further comprising:
    applying a digital signature to the electronic document including the open document format (ODF) in the XFDL format container prior to the submitting.

6. The method of claim 1 wherein the server receives the electronic document including the open document format (ODF) in an XFDL format container and analyzes the electronic document including the open document format (ODF) in the XFDL format container to determine a next process step.

7. The method of claim 6 wherein the server distributes the electronic document including the open document format (ODF) in the XFDL format container in response to determining that the electronic document including the open document format (ODF) in the XFDL format container is incomplete, and stores the electronic document including the open document format (ODF) in the XFDL format container in response to determining that the electronic document including the open document format (ODF) in the XFDL format container is complete.

8. The method of claim 1 wherein the electronic document including the open document format (ODF) in the XFDL format container is transferred to the server identified in the server description in the electronic document including the open document format (ODF) in the XFDL format container in response to the submission event, the transferring performed absent a user initiated save request and absent a user initiated electronic mail message.

9. A computer program product comprising:
a non-transitory storage medium readable by a processing unit and storing instructions for execution by the processing unit for implementing a method, the method comprising:
populating an electronic document supporting structured and unstructured content, wherein the electronic document is comprised of multiple formats, including an open document format (ODF) in an extensible forms description language (XFDL) format container, and wherein the electronic document including the open document format (ODF) in the XFDL format container further comprises:
process logic that defines steps of a fill experience and validates the structured and unstructured content populated in the electronic document:
a description identifying a server; and
the structured and unstructured content;
serializing a portion of the electronic document, which includes the open document format (ODF) in the XFDL format container, that includes some of the unstructured content; and
submitting the electronic document including the open document format (ODF) in the XFDL format container to the server.

10. The computer program product of claim 9, the method further comprising:
accessing at least one of the server and a remote server to provide a service to assist in populating the electronic document including the open document format (ODF) in the XFDL format container; and
applying a digital signature to the electronic document including the open document format (ODF) in the XFDL format container prior to the submitting.

11. The computer program product of claim 9, the method further comprising transferring the electronic document including the open document format (ODF) in the XFDL format container to the server identified in the server description in the electronic document including the open document format (ODF) in the XFDL format container in response to the submission event, the transferring performed absent a user initiated save request and absent a user initiated electronic mail message.

12. The computer program product of claim 9 wherein the process logic further includes methods responsive to user input to perform actions upon the electronic document including the open document format (ODF) in the XFDL format container and modify properties of the electronic document including the open document format (ODF) in the XFDL format container.

13. A method comprising:
receiving an electronic document supporting structured and unstructured content at a client system, wherein the structured content is comprised of multiple instances of extensible markup language (XML) data, business process logic is XForms compatible, and the unstructured content is open document format (ODF) compatible, the electronic document further comprising:
multiple formats including an open document format (ODF) in an extensible forms description language (XFDL) format container;
a description identifying a server to submit the electronic document including the open document format (ODF) in the XFDL format container;
business process logic controlling actions performed on the electronic document including the open document format (ODF) in the XFDL format container; and
the structured and unstructured content;
populating the electronic document including the open document format (ODF) in the XFDL format container using web services;
applying a digital signature to the electronic document including the open document format (ODF) in the XFDL format container;
serializing a portion of the electronic document, which includes the open document format (ODF) in the XFDL format container, that includes some of the unstructured content; and
submitting the electronic document including the open document format (ODF) in the XFDL format container to the server.

14. A computer program product comprising:
a non-transitory storage medium readable by a processing unit and storing instructions for execution by the processing unit for implementing a method, the method comprising:
receiving an electronic document supporting structured and unstructured content at a client system, wherein the structured content is comprised of multiple instances of extensible markup language (XML) data, business process logic is XForms compatible, and the unstructured content is open document format (ODF) compatible, the electronic document further comprising:
multiple formats including an open document format (ODF) in an extensible forms description language (XFDL) format container;
a description identifying a server to submit the electronic document including the open document format (ODF) in the XFDL format container;
business process logic controlling actions performed on the electronic document including the open document format (ODF) in the XFDL format container; and
the structured and unstructured content;
populating the electronic document including the open document format (ODF) in the XFDL format container using web services;
applying a digital signature to the electronic document including the open document format (ODF) in the XFDL format container;
serializing a portion of the electronic document, which includes the open document format (ODF) in the XFDL format container, that includes some of the unstructured content; and
submitting the serialized electronic document including the open document format (ODF) in the XFDL format container to the server.

* * * * *